US008222594B2

(12) United States Patent
Makinouchi et al.

(10) Patent No.: US 8,222,594 B2
(45) Date of Patent: Jul. 17, 2012

(54) ENCODER THAT OPTICALLY DETECTS POSITIONAL INFORMATION OF A MOVABLE BODY BY CHANGING A PATH LENGTH THROUGH PERIODIC OSCILLATION OF AN OPTICAL ELEMENT

(75) Inventors: Susumu Makinouchi, Zama (JP); Toru Imai, Natori (JP); Akihiro Watanabe, Sendai (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/731,725

(22) Filed: Mar. 25, 2010

(65) Prior Publication Data

US 2010/0176282 A1 Jul. 15, 2010

Related U.S. Application Data

(63) Continuation of application No. PCT/JP2008/002755, filed on Oct. 1, 2008.

(30) Foreign Application Priority Data

Oct. 5, 2007 (JP) ................................ 2007-261541

(51) Int. Cl.
*G01D 5/34* (2006.01)

(52) U.S. Cl. .................................................. 250/231.13

(58) Field of Classification Search ................ 250/231.13–231.18; 341/11, 13; 356/616, 617, 482, 486, 493, 498, 499, 521
See application file for complete search history.

(56) References Cited

U.S. PATENT DOCUMENTS

| | | | | |
|---|---|---|---|---|
| 5,629,793 | A * | 5/1997 | Takamiya et al. | 359/278 |
| 6,639,686 | B1 | 10/2003 | Ohara | |
| 2006/0290939 | A1 * | 12/2006 | Vakhtin et al. | 356/456 |
| 2007/0057168 | A1 | 3/2007 | Imai | |
| 2007/0267571 | A1 | 11/2007 | Makinouchi et al. | |

FOREIGN PATENT DOCUMENTS

| | | |
|---|---|---|
| JP | A-60-98302 | 6/1985 |
| JP | 61176907 A * | 8/1986 |
| JP | A-61-176907 | 8/1986 |
| JP | A-2006-343314 | 12/2006 |
| JP | A-2007-170938 | 7/2007 |
| JP | A-2007-333722 | 12/2007 |

OTHER PUBLICATIONS

Nov. 18, 2008 International Search Report issued in International Application No. PCT/JP2008/002755.
Nov. 18, 2008 Written Opinion issued in Application No. PCT/JP2008/002755 (with English translation).

* cited by examiner

*Primary Examiner* — Thanh X Luu
(74) *Attorney, Agent, or Firm* — Oliff & Berridge, PLC

(57) ABSTRACT

A reflection mirror that causes an illumination light to be incident on a movable scale is oscillated in an X-axis direction based on a modulation signal. Accordingly, the optical path of the illumination light, of the illumination light and another illumination light generated at an index scale, periodically changes, and as a consequence, the illumination light is periodically modulated. Accordingly, an extra scanner that scans the illumination light or another illumination light with respect to the movable scale does not have to be arranged, which allows an apparatus to be reduced in size and cost.

15 Claims, 8 Drawing Sheets

10A
12
LB
20
31
LB2
LB1
24
LB12
26
Z
Y
X

ENCODER THAT OPTICALLY DETECTS POSITIONAL INFORMATION OF A MOVABLE BODY BY CHANGING A PATH LENGTH THROUGH PERIODIC OSCILLATION OF AN OPTICAL ELEMENT

CROSS-REFERENCE TO RELATED APPLICATIONS

This application is a continuation of International Application PCT/JP2008/002755, with an international filing date of Oct. 1, 2008, the disclosure of which is hereby incorporated herein by reference in its entirety, which was not published in English.

BACKGROUND OF THE INVENTION

1. Field of the Invention

The present invention relates to encoders, and more particularly to an encoder that optically detects positional information of a movable body.

2. Description of the Background Art

As an encoder by a scan method, an encoder has been proposed that irradiates an illumination light, which is modulated based on a predetermined modulation signal, on a scale that moves with a movable body and has a grating periodically formed along a movement direction, and compares a reflected light or a transmitted light of the illumination light with the modulation signal, thereby detecting positional information of the scale (e.g. refer to U.S. Pat. No. 6,639,686).

In the encoder by a scan method, since the incidence position of the illumination light with respect to the scale needs to be periodically changed, for example, an oscillating mirror (a scanner) or the like used to oscillate the illumination light in a direction orthogonal to its propagation direction needs to be placed in an optical path of the illumination light. Therefore, in this type of the encoder, a space used to install the oscillating mirror or the like becomes necessary, which causes the inconvenience such as the increase in size and cost of an apparatus.

SUMMARY OF THE INVENTION

According to the present invention, there is provided an encoder that detects positional information of a movable body, making use of interference of a first illumination light and a second illumination light, the encoder comprising: a scale that has a pattern arrayed in a movement direction of the movable body, and moves relative to the first illumination light and the second illumination light according to movement of the movable body; an optical system that irradiates the first illumination light and the second illumination light on the pattern of the scale; and a modulator that periodically changes at least one of an optical path length of the first illumination light and an optical path length of the second illumination light.

With this encoder, the optical path length of at least one of the first illumination light and the second illumination light is periodically changed by the modulator. Accordingly, an oscillating mirror, a scanner or the like that scans one of the first illumination light and the second illumination light with respect to the scale does not have to be arranged, and therefore it becomes possible to decrease the size and cost of an apparatus.

BRIEF DESCRIPTION OF THE DRAWINGS

In the accompanying drawings.

DESCRIPTION OF THE EMBODIMENTS

An embodiment of the present invention is described below, with reference to FIG. 1.

Figure 1:
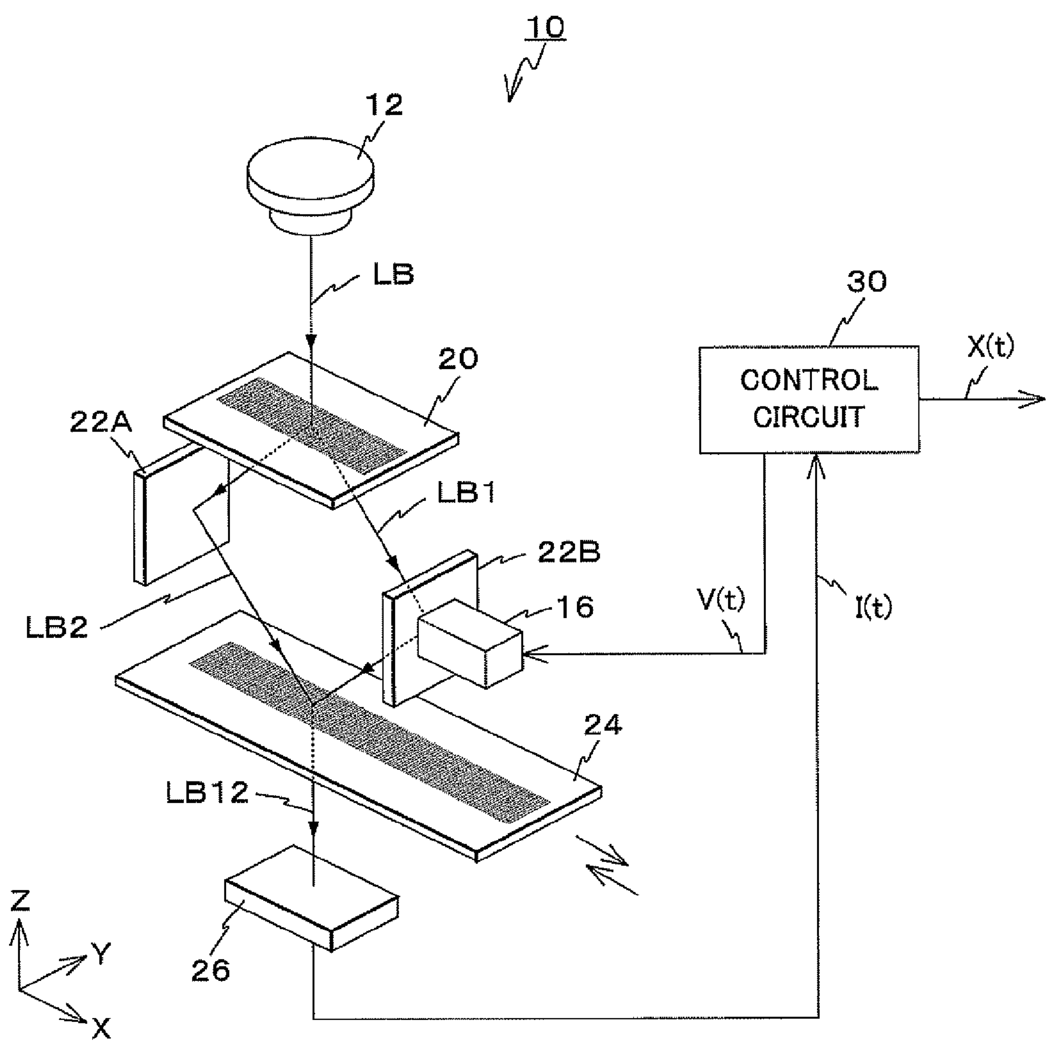
FIG. 1 is a view schematically showing a configuration of an encoder 10 related to an embodiment of the present invention.

FIG. 1 shows a schematic configuration of an encoder 10 related to an embodiment of the present invention. As shown in FIG. 1, encoder 10 is an encoder by a so-called diffraction interference method and is a linear encoder that detects a movement direction, a movement distance, or displacement of a movable body that moves in an X-axis direction.

As shown in FIG. 1, encoder 10 is equipped with a light source 12, an index scale 20, a pair of reflection mirrors 22A and 22B, an actuator 16, a movable scale 24, a photodetection element 26 and a control circuit 30.

Light source 12 emits a coherent light, for example, an illumination light LB with a wavelength $\lambda$ (=850 nm) downward (toward a −Z direction) in FIG. 1.

Index scale 20 is placed below light source 12. Index scale 20 is a transmissive phase grating on which a diffraction grating whose periodic direction is in the X-axis direction is formed. And, when illumination light LB emitted from light source 12 is incident on index scale 20, index scale 20 generates a plurality of diffraction lights. In FIG. 1, of those diffraction lights, the ±first-order diffraction lights generated at index scale 20 are shown. In the description below, the +first-order diffraction light outgoing toward the +X side is referred to as an illumination light LB1 and the −first-order diffraction light outgoing toward the −X side is referred to as an illumination light LB2.

Reflection mirrors 22A and 22B are respectively placed at positions below index scale 20 that are a predetermined distance apart in the −X direction and the +X direction from a vertical axis that passes through the center of light source 12, in a state of being opposed to each other. Reflection mirrors 22A and 22B respectively deflect illumination light LB1 and illumination light LB2 generated at index scale 20, and cause illumination lights LB1 and LB2 to be incident on movable scale 24 in a state where illumination lights LB1 and LB2 at least partly overlap with each other.

Actuator 16 is made up of, for example, a piezo element, and has the −X side end that is fixed to the surface on the +X side of reflection mirror 22B. Actuator 16 periodically oscillates reflection mirror 22B in the X-axis direction based on a modulation signal V(t) supplied from control circuit 30.

Movable scale 24 is placed below reflection mirrors 22A and 22B so as to be movable in the X-axis direction together with a movable body that is not illustrated. Movable scale 24 is a transmissive phase grating having a periodic direction in the X-axis direction, on which a diffraction grating whose spatial frequency is ω is formed. And, illumination light LB1 and illumination light LB2 generated at index scale 20 undergo the ±first diffraction at movable scale 24, thereby being incident on photodetection element 26 in a state of interfering with each other. In the description below, illumination lights LB1 and LB2 that have been transmitted through movable scale 24 are referred to as an interference light LB12 as a whole.

Photodetection element 26 is placed below movable scale 24. When interference light LB12 from movable scale 24 is incident on photodetection element 26, photodetection element 26 outputs a photoelectric conversion signal I(t) in accordance with the interference degree of interference light LB12.

Control circuit 30 generates modulation signal V(t) as expressed in the following formula (1) and supplies it to actuator 16. Then, control circuit 30 outputs a signal X(t) that includes positional information of movable scale 24 based on photoelectric conversion signal I(t) output from photodetection element 26. In this case, "r" denotes a coefficient, "$\omega_r$" denotes an angular frequency, and "t" denotes a time.

$$V(t)=r\cdot\sin(\omega_r\cdot t) \quad (1)$$

When modulation signal V(t) is supplied to actuator 16, reflection mirror 22B oscillates with a frequency f ($=\omega_r/2\pi$) in the X-axis direction. Accordingly, the optical path length of illumination light LB1, of illumination lights LB1 and LB2 generated at index scale 20, is periodically changed, and as a consequence, illumination light LB1 is periodically modulated. Then, illumination light LB1 and illumination light LB2 are incident on movable scale 24 in a state of at least partly overlapping.

On movable scale 24, the interference fringe is formed by the interference between illumination light LB1 and illumination light LB2. Then, this interference fringe moves (oscillates) along the X-axis, in proportion to angular frequency ω of modulation signal V(t). As a consequence, photoelectric conversion signal I(t) that is obtained by photodetection element 26 receiving interference light LB12 becomes equivalent to a signal that is obtained by modulating positional information of movable scale 24 with modulation signal V(t), and is expressed in the following formula (2). In this case, "A" denotes the amplitude of displacement of the interference fringe that moves on the movable scale, "$x_0$" denotes an initial offset quantity, and "x" denotes a phase of movable scale 24 with respect to index scale 20.

$$I(t)=x_0+A\cdot\cos[\omega(r\cdot\omega\cdot\sin(\omega_r\cdot t)+\omega\cdot x)] \quad (2)$$

Control circuit 30 computes positional information and movement information of movable scale 24 by performing, for example, the processing described in U.S. Pat. No. 6,639,686, to photoelectric conversion signal I(t), and outputs the computed information as output signal X(t) of encoder 10.

As is described above, in encoder 10 related to the present embodiment, reflection mirror 22B is oscillated in the X-axis direction based on modulation signal V(t). Accordingly, the optical path length of illumination light LB1, of illumination light LB1 and illumination light LB2 generated at index scale 20, periodically changes, and as a consequence, illumination light LB1 is periodically modulated. Therefore, an extra scanner that scans illumination light LB1 or illumination light LB2 with respect to the movable scale does not have to be arranged, which allows an apparatus to be reduced in size and cost.

Incidentally, in the present embodiment, while only reflection mirror 22B is oscillated by actuator 16 in the X-axis direction, it is also possible, for example, that only reflection mirror 22A is oscillated. Or, reflection mirrors 22A and 22B can be oscillated such that the phases of the reflection mirrors become opposite to each other.

Further, as the configuration of an encoder that changes the optical path length of illumination light LB1 or illumination light LB2, various configurations can be considered, besides the configuration of encoder 10 as described above. In the description below, six examples are specifically explained.

Modified Example 1

Figure 2:
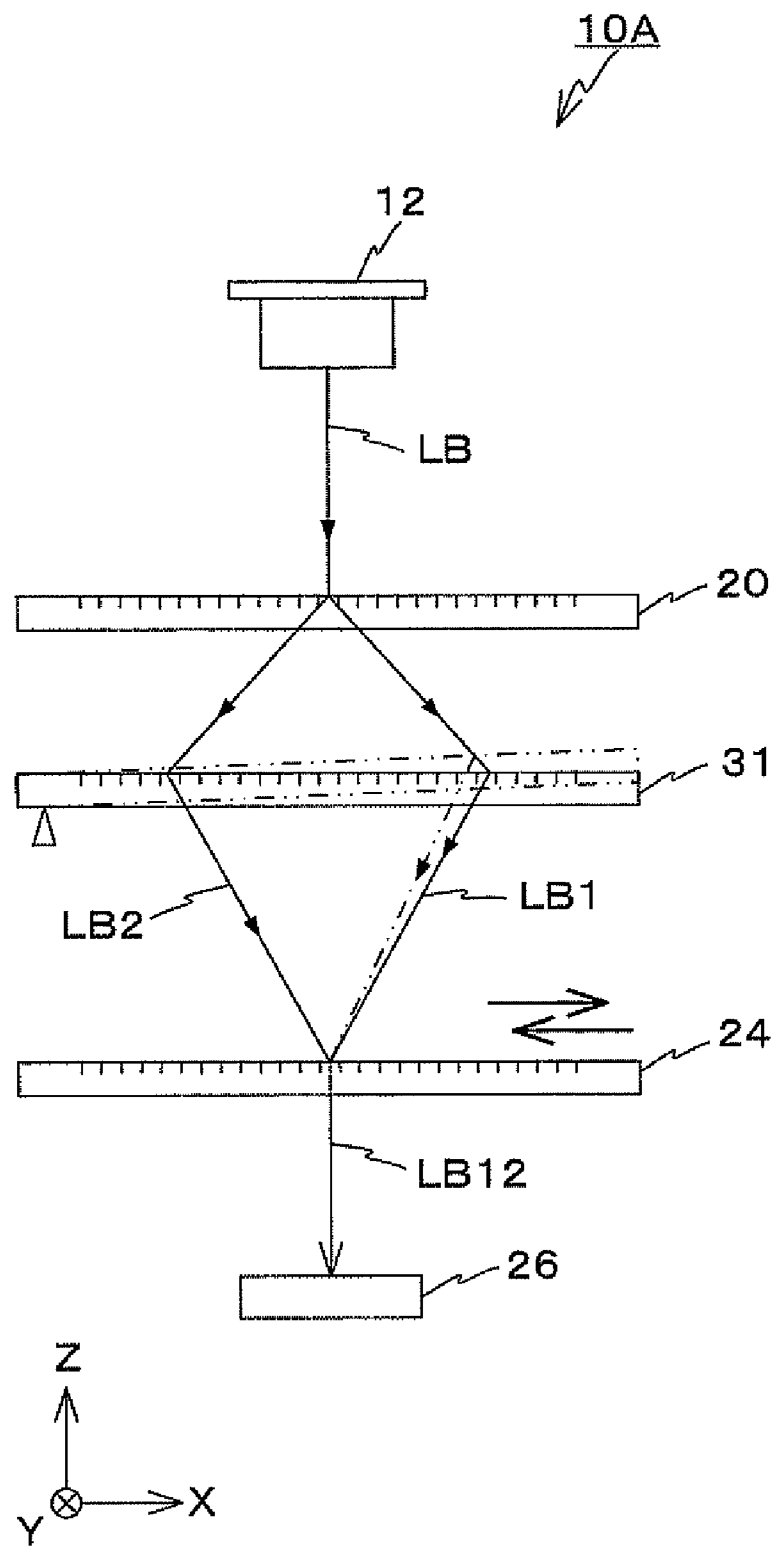
FIG. 2 is a view showing a schematic configuration of an encoder 10A.

FIG. 2 is a view showing an encoder 10A related to a modified example 1. Encoder 10A is different from encoder 10 in that a second index scale 31 is placed below index scale 20, instead of reflection mirrors 22A and 22B.

Second index scale 31 is placed so as to be capable of turning around an axis parallel to a Y-axis with the −X side end serving as the center. And, the attitude of second index scale 31 periodically changes from the attitude indicated by a solid line to the attitude indicated by two-dot chain line as shown in FIG. 2, because the +X side end of second index scale 31 is oscillated in the vertical direction by an actuator that is not illustrated. Accordingly, in encoder 10A, the optical path length of illumination light LB1 is periodically changed, and the periodic optical path difference occurs between the optical path of illumination light LB1 and the optical path of illumination light LB2. Consequently, encoder 10A can detect positional information of movable scale 24, similarly to encoder 10.

Incidentally, in this modified example, while second index scale 31 is turned, this is not intended to be limiting, and it is also possible that second index scale 31 is periodically curved by oscillating the +X side end of second index scale 31, with the −X side end serving as the origin.

Modified Example 2

Figure 3:
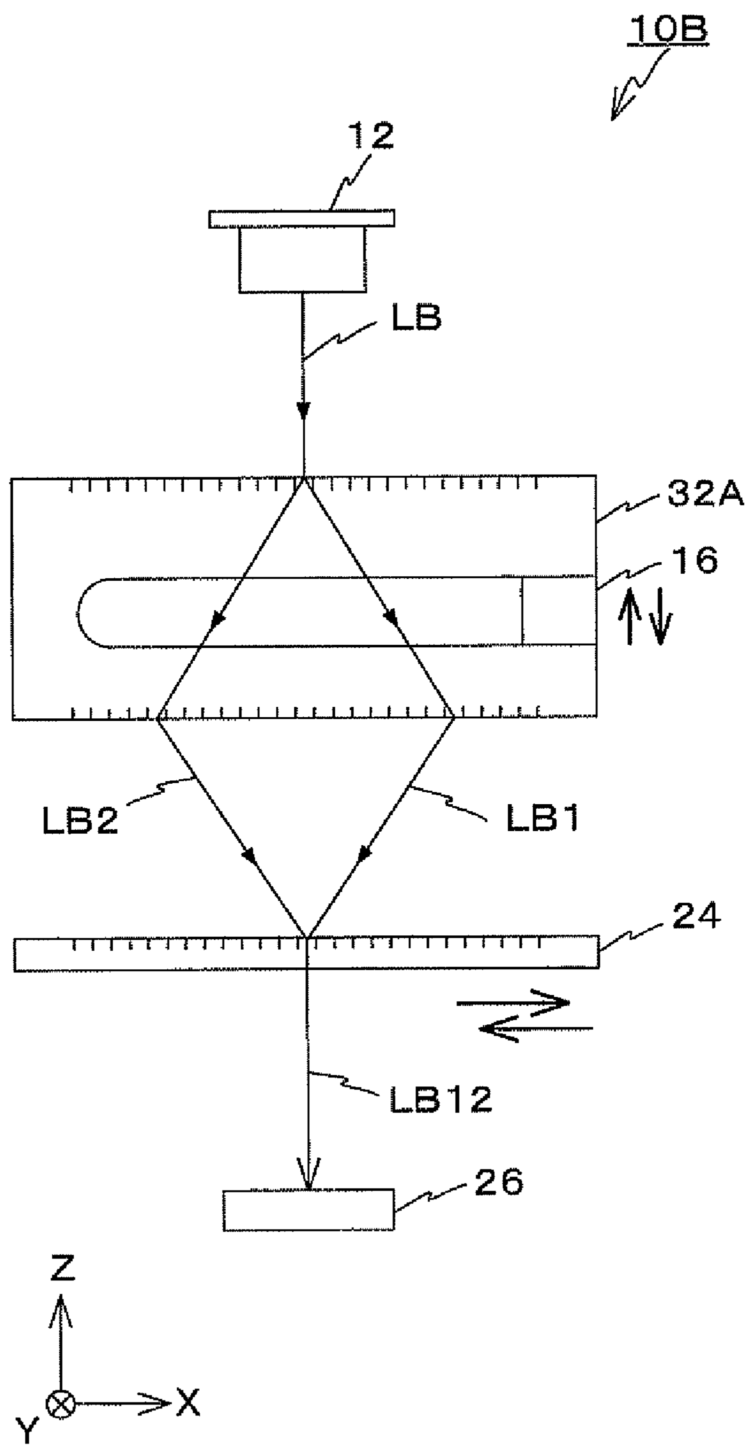
FIG. 3 is a view showing a schematic configuration of an encoder 10B.

FIG. 3 shows an encoder 10B related to a modified example 2. Encoder 10B is different from encoder 10 in that a glass member 32A having a U-like shape is placed below light source 12, instead of index scale 20 and reflection mirrors 22A and 22B.

Glass member 32A is a member with a U-like ZX sectional shape that is made up of three sections, which are a set of plate-shaped sections that are placed, with the X-axis direction serving as their longitudinal directions, so as to be opposed in the vertical direction, and a connecting section that connects the −X side ends of the respective plate-shaped sections. Further, of a set of the plate-shaped sections, the plate-shaped section located on the upper side is shaped so as to be thicker than the plate-shaped section located on the lower side, and on the +X side ends of the respective plate shaped sections, the upper end and the lower end of actuator 16 that expands/contracts in the vertical direction are fixed. And, on the upper surface of the plate-shaped section on the upper side, a diffraction grating that diffracts illumination light LB and generates illumination light LB1 and illumination light LB2 is formed, similarly to the index scale 20. Further, on the lower surface of the plate-shaped section on the lower side, a diffraction grating is formed that diffracts illumination light LB1 and illumination light LB2 and causes the illumination lights to be incident on movable scale 24 in a state where the illumination lights at least partly overlap.

Figure 4A:
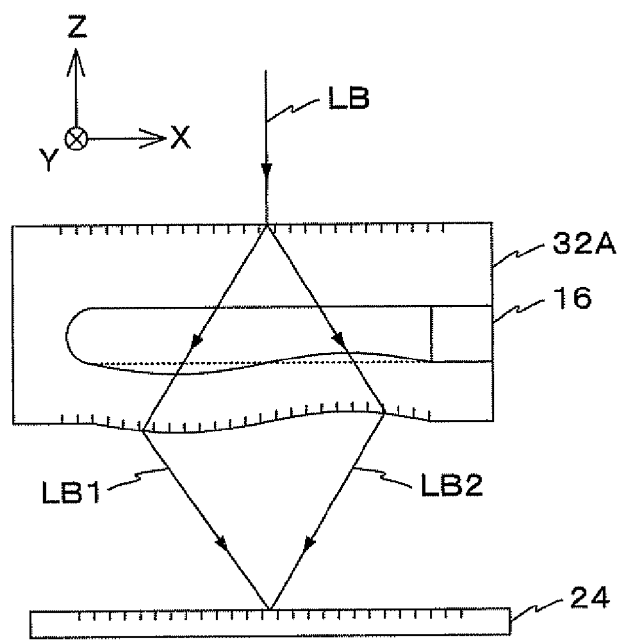
FIGS. 4A and 4B are views used to explain an operation of a glass member 32A.
Figure 4B:
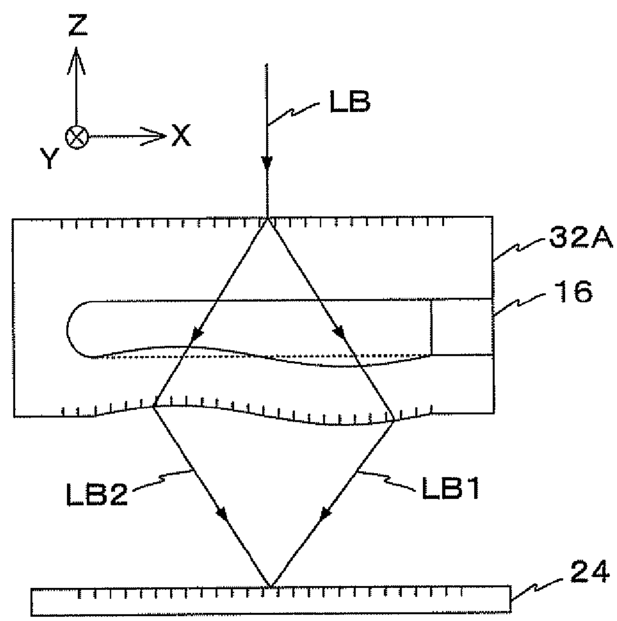

In glass member 32A configured as described above, when actuator 16 is periodically expanded/contracted based on modulation signal V(t), the lower side plate-shaped section having a low stiffness is elastically deformed into a sine wave shape, periodically, as shown in FIGS. 4A and 4B. Accordingly, the optical path length of illumination light LB1 and the optical path length of illumination light LB2 periodically change and the periodic optical path difference occurs between the optical path of illumination light LB1 and the optical path of illumination light LB2. Accordingly, encoder 10B can detect positional information of movable scale 24, similarly to encoder 10.

Modified Example 3

Figure 5:
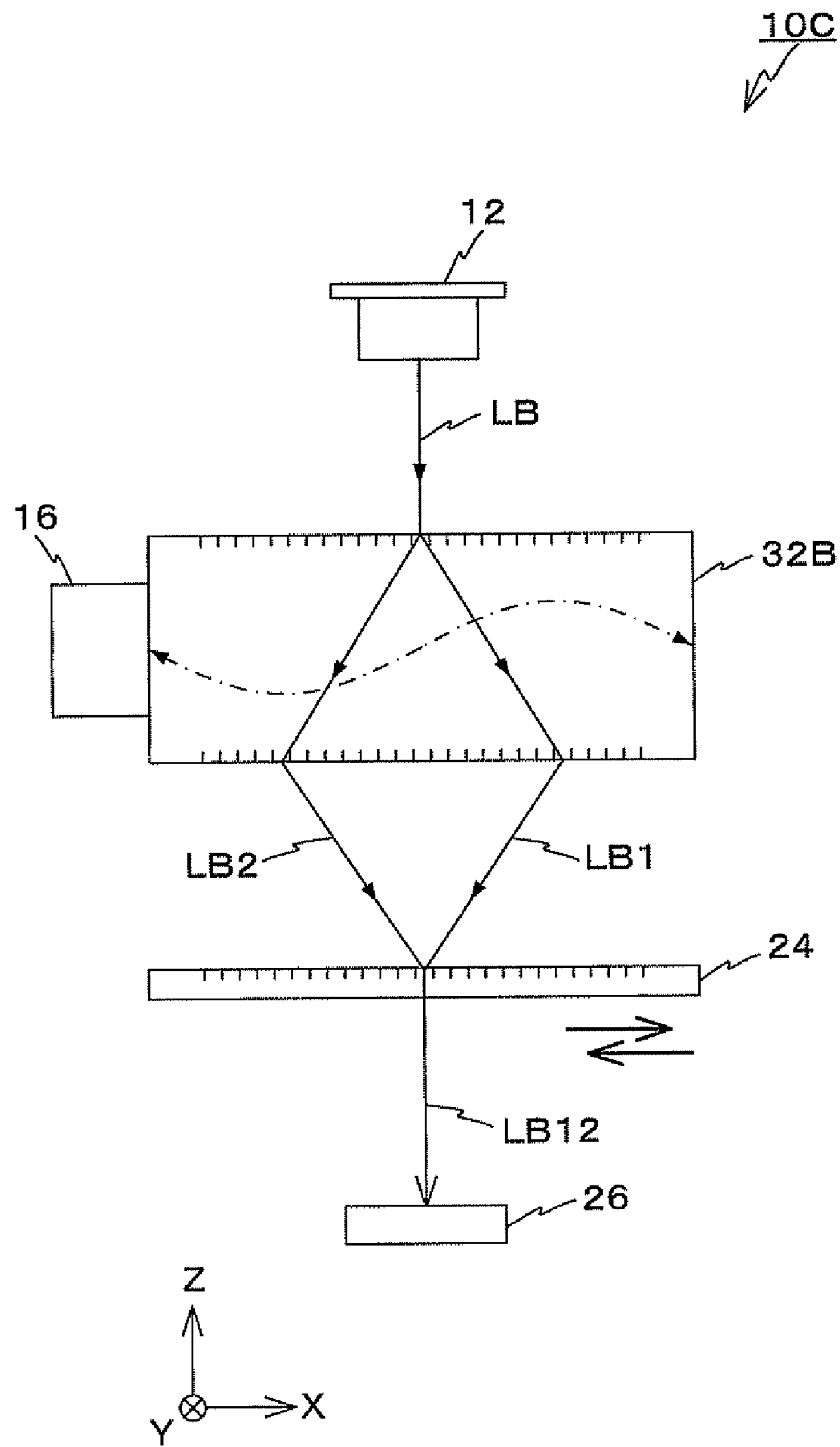
FIG. 5 is a view showing a schematic configuration of an encoder 10C.

FIG. 5 is a view showing an encoder 10C related to a modified example 3. Encoder 10C is different from encoder 10 in that a glass member 32B having a rectangular parallelepiped shape is placed below light source 12, instead of index scale 20 and reflection mirrors 22A and 22B.

Glass member 32B is placed with the X-axis direction serving as its longitudinal direction, and on the upper surface of glass member 32B, a diffraction grating that generates illumination light LB1 and illumination light LB2 is formed, similarly to index scale 20. Further, on the lower surface of glass member 32B, a diffraction grating is formed that diffracts illumination light LB1 and illumination light LB2 respectively and causes the illumination lights to be incident on movable scale 24 in a state where the illumination lights at least partly overlap. The pressure in the +X direction is made to operate on the surface on the −X side of glass member 32B, by actuator 16 that expands/contracts in the X-axis direction.

In encoder 10C, actuator 16 is expanded/contracted based on modulation signal V(t) having a frequency equivalent to the eigenfrequency of glass member 32B, and thereby glass member 32B elastically deforms (expands/contracts) in the X-axis direction periodically, and the refractive-index distribution inside glass member 32B periodically varies. Accordingly, the optical path lengths of illumination light LB1 and illumination light LB2 periodically change and the periodic optical path difference occurs between the optical path of illumination light LB1 and the optical path of illumination light LB2. Therefore, encoder 10C can detect positional information of movable scale 24, similarly to encoder 10.

Modified Example 4

Figure 6:
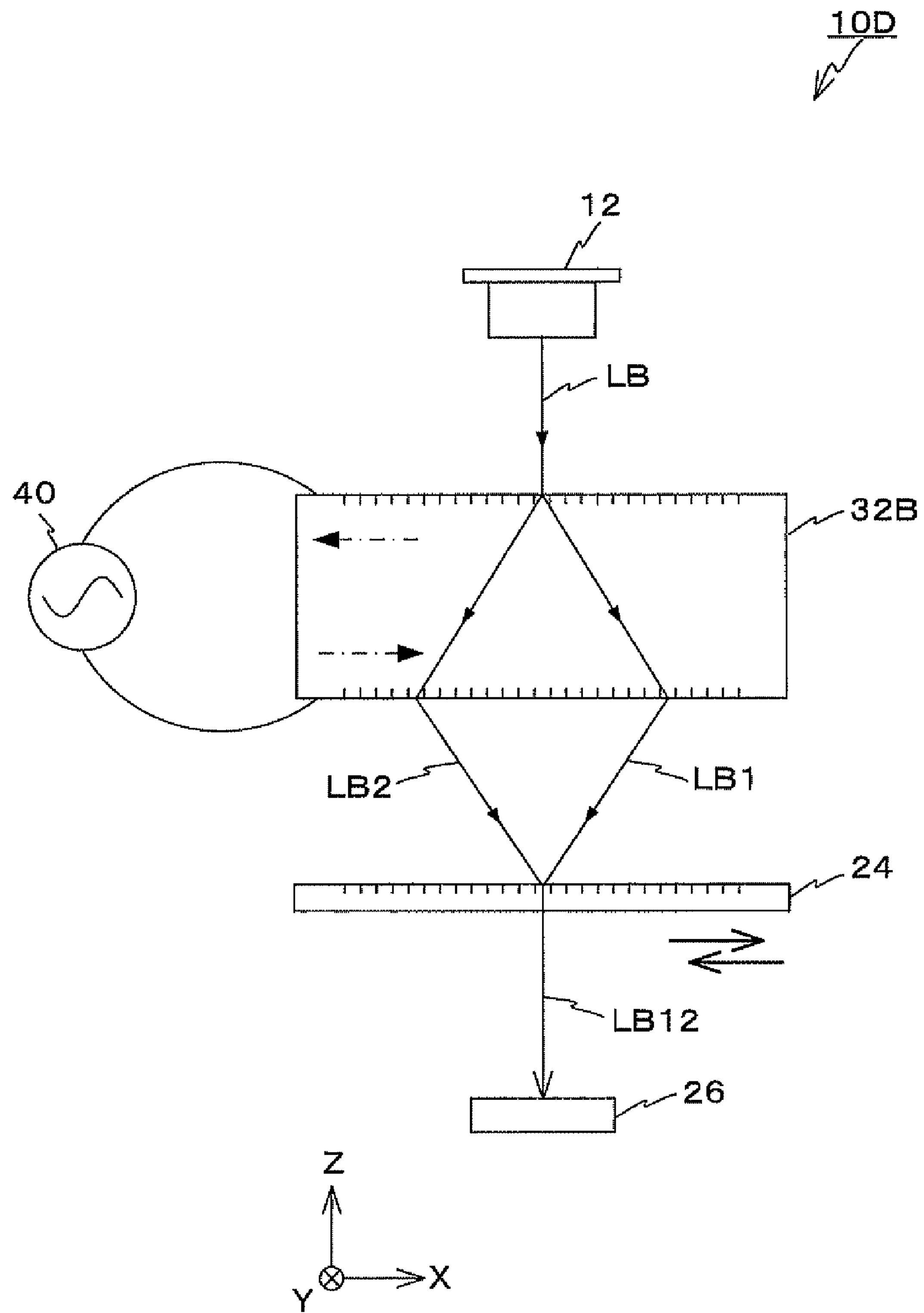
FIG. 6 is a view showing a schematic configuration of an encoder 10D.

FIG. 6 is a view showing an encoder 10D related to a modified example 4. Encoder 10D is different from encoder 10 in that a glass member 32B having a rectangular parallelepiped shape is placed below light source 12, instead of index scale 20 and reflection mirrors 22A and 22B.

Glass member 32B is placed with X-axis direction serving as its longitudinal direction, and on the upper surface, a diffraction grating that generates illumination light LB1 and illumination light LB2 is formed, similarly to index scale 20. Further, on the lower surface of glass member 32B, a diffraction grating is formed that diffracts illumination light LB1 and illumination light LB2 and causes the illumination lights to be incident on movable scale 24 in a state where the illumination lights at least partly overlap.

In encoder 10D, the AC voltage having a frequency equivalent to modulation signal V(t) is applied on the upper surface and the lower surface of glass member 32B, via a voltage source 40, and thereby glass member 32B elastically deforms owing to the direct piezoelectric effect, and the refractive-index distribution inside glass member 32B periodically varies. Therefore, the optical path lengths of illumination light LB1 and illumination light LB2 periodically change, and the periodic optical path difference occurs between the optical path of illumination light LB1 and the optical path of illumination light LB2. Therefore, encoder 10D can detect positional information of movable scale 24, similarly to encoder 10.

Incidentally, in encoders 10B, 10C and 10D related to the modified examples, the optical path difference occurs between the optical path of illumination light LB1 and the optical path of illumination light LB2 by elastically deforming the glass member. However, the present invention is not limited thereto, and it is also possible, for example, that a crystal that is transmissive to an illumination light or an optical element made of a transparent resin is used, instead of the glass member, and this optical element is elastically deformed.

The present invention can also be applied to, for example, the encoder disclosed in Kokai (Japanese Unexamined Patent Application Publication) No. 60-098302. In the description below, two applications are specifically explained. Incidentally, the configurations and operations of encoders related to an application 1 and an application 2 are disclosed in detail in Kokai (Japanese Unexamined Patent Application Publication) No. 60-098302. Therefore, the detailed explanation thereabout is omitted here.

Application 1

Figure 7:
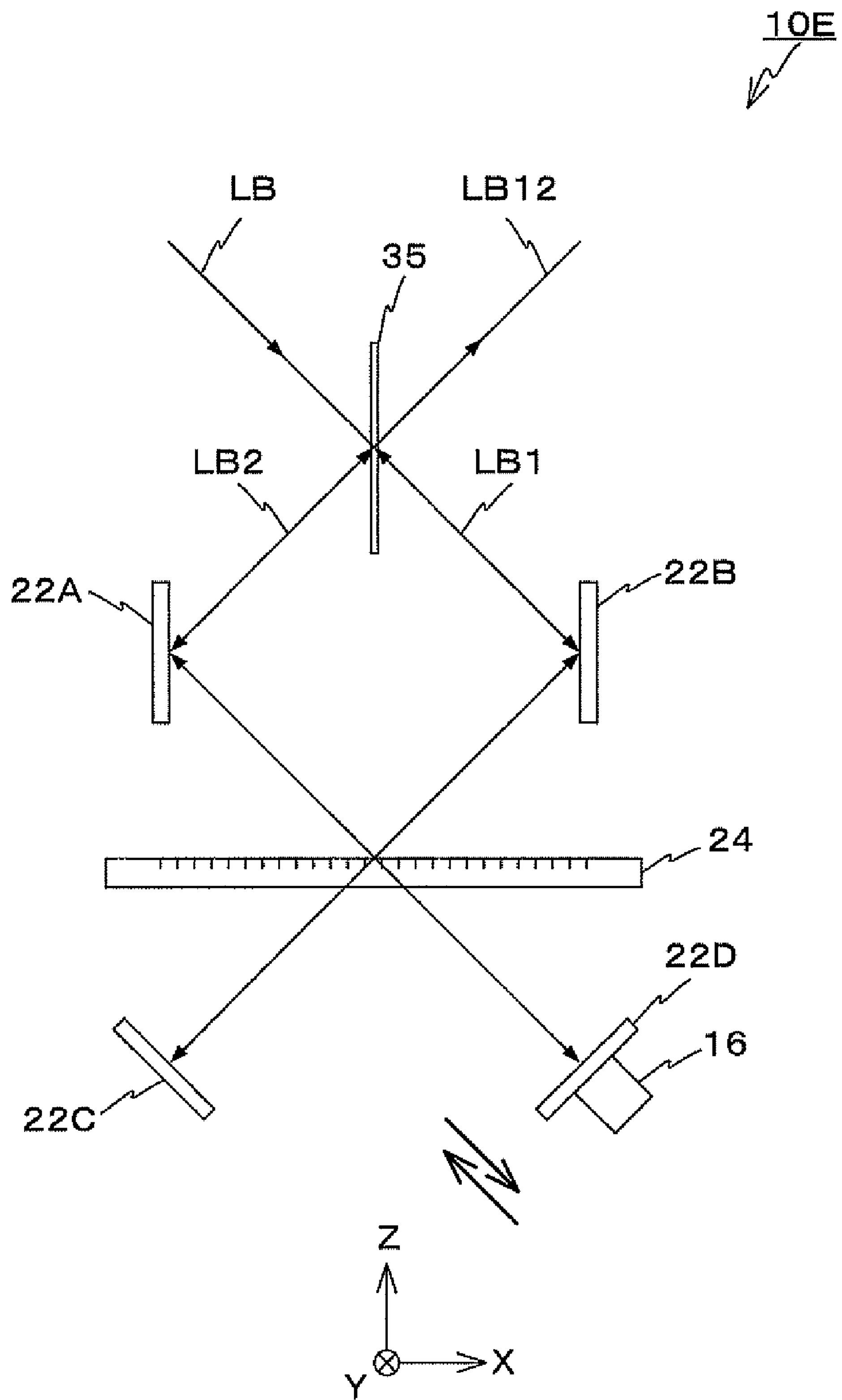
FIG. 7 is a view showing a schematic configuration of an encoder 10E.

FIG. 7 is a view showing an encoder 10E related to an application 1. Encoder 10E is configured including a beam splitter 35, reflection mirrors 22A and 22B placed so as to be opposed to each other below beam splitter 35, movable scale 24 placed below reflection mirrors 22A and 22B, reflection mirrors 22C and 22D placed below movable scale 24, actuator 16 that periodically oscillates reflection mirror 22D, and the like.

In encoder 10E configured as described above, illumination light LB that is obliquely incident on beam splitter 35 is branched into illumination light LB1 that propagates toward reflection mirror 22B and illumination light LB2 that propagates toward reflection mirror 22A, as shown in FIG. 7. Then, illumination lights LB1 and LB2 are deflected by reflection mirrors 22A and 22B respectively, and then are incident on movable scale 24 in a state of at least partly overlapping. Illumination lights LB1 and LB2 incident on movable scale 24 are transmitted through movable scale 24 and then are incident on reflection mirror 22C and reflection mirror 22D, respectively.

Illumination light LB1 and illumination light LB2 incident on reflection mirrors 22C and 22D, respectively, are reflected off reflection mirrors 22C and 22D, and thereby are obliquely incident on beam splitter 35 via movable scale 24 and reflections mirrors 22A and 22B, in the order reverse to the previously described order. Then, illumination light LB1 is reflected off the surface on the +X side of beam splitter 35 and illumination light LB2 is transmitted through beam splitter 35, and thereby illumination light LB1 and illumination light LB2 are synthesized and received, as interference light LB12, by a photodetection element that is not illustrated.

In encoder 10E, reflection mirror 22D that reflects illumination light LB2 that has been transmitted through movable scale 24 is periodically oscillated, by actuator 16, parallel to the incidence direction of illumination light LB2. Accordingly, the optical path length of illumination light LB2 periodically changes, and the periodic optical path difference occurs between the optical path of illumination light LB1 and the optical path of illumination light LB2. Therefore, encoder 10E can detect positional information of movable scale 24, similarly to encoder 10.

Application 2

Figure 8:
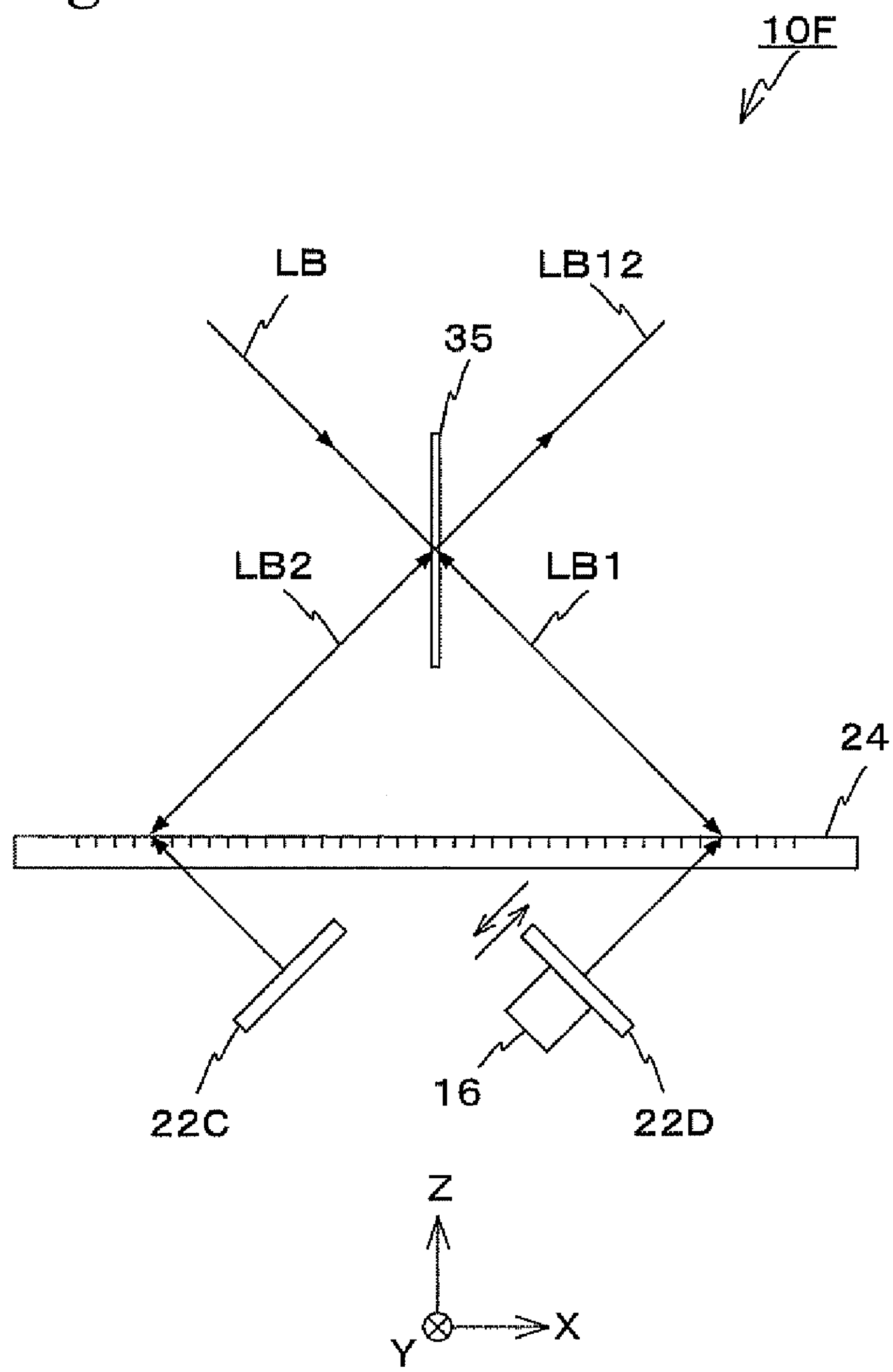
FIG. 8 is a view showing a schematic configuration of an encoder 10F.

FIG. 8 is a view showing an encoder 10F related to an application 2. Encoder 10F is configured including beam splitter 35, movable scale 24 placed below beam splitter 35, reflection mirrors 22C and 22D placed below movable scale 24, actuator 16 that periodically oscillates reflection mirror 22D, and the like.

In encoder 10F configured as described above, illumination light LB obliquely incident on beam splitter 35 is branched into illumination light LB1 and illumination light LB2, as shown in FIG. 8. Then, illumination light LB1 and illumination light LB2 are incident on two different points on movable scale 24, respectively, and are diffracted at movable scale 24 and then are incident on reflection mirrors 22C and 22D, respectively.

Illumination light LB1 and illumination light LB2 incident on reflection mirrors 22C and 22D, respectively, are reflected off reflection mirrors 22C and 22D, and are obliquely incident on beam splitter 35 via movable scale 24, in the order reverse to the previously described order. Then, illumination light LB1 is reflected off the surface on the +X side of beam splitter 35 and illumination light LB2 is transmitted through beam splitter 35, and thereby illumination light LB1 and illumination light LB2 are synthesized and received, as interference light LB12, by a photodetection element that is not illustrated.

In encoder 10F, reflection mirror 22D that reflects illumination light LB2 that has been transmitted through movable scale 24 is periodically oscillated, by actuator 16, parallel to the incidence direction of illumination light LB2, and thereby the optical path length of illumination light LB2 periodically changes. Accordingly, the periodic optical path difference occurs between the optical path of illumination light LB1 and the optical path of illumination light LB2. Therefore, encoder 10F can detect positional information of movable scale 24, similarly to encoder 10.

Further, in the embodiment, the modified examples and the applications, the case has been described where movable scale 24 moves relative to the illumination light. However, the present invention is not limited thereto, and the present invention can also be employed in the case where the section other than movable scale 24 moves together with the movable body. The point is that a configuration can be employed in which movable scale 24 and another optical member or the illumination light relatively move.

Further, in the embodiment, the case has been described where index scale 20 and movable scale 24 each have the phase grating. However, the present invention is not limited thereto, and index scale 20 and movable scale 24 can each have a diffraction grating of an amplitude type (a diffraction grating of a bright/dark type), or one of index scale 20 and movable scale 24 can have the diffraction grating of an amplitude type and the other can have the phase grating.

Further, in the embodiment, the ±first order diffraction lights are used as the measurement lights. However, the present invention is not limited thereto, and the interference light of the higher order diffraction lights can be used as the measurement light. And, the interference light of the different order diffraction lights such as the 0 order light and the $n^{th}$ order (or $-n^{th}$ order) diffraction light, or the $+n^{th}$ order diffraction light and the $+(m+n)^{th}$ order diffraction light can also be used as the measurement lights.

Further, in the embodiment, the explanation has been given assuming that encoder 10 is a liner encoder that detects positional information of the movable body in the one axial direction. However, the present invention is not limited thereto, but can also be applied to a rotary encoder that detects the rotation amount of a rotatable body.

While the above-described embodiment of the present invention is the presently preferred embodiment thereof, those skilled in the art of encoders will readily recognize that numerous additions, modifications, and substitutions may be made to the above-described embodiment without departing from the spirit and scope thereof. It is intended that all such additions, modifications, and substitutions fall within the scope of the present invention, which is best defined by the claims appended below.

What is claimed is:

1. An encoder that detects positional information of a movable body, making use of interference of a first illumination light and a second illumination light, the encoder comprising:
   - a scale that has a pattern arrayed in a movement direction of the movable body, and moves relative to the first illumination light and the second illumination light according to movement of the movable body:
   - a light source that emits an illumination light:
   - an optical system that generates the first illumination light and the second illumination light from the illumination light:
   - an optical element that is arranged in an optical path between the optical system and a photodetection element, wherein the optical element respectively deflects the first illumination light and the second illumination light generated at the optical system and causes the first illumination light and the second illumination light to be incident on the scale:
   - a modulator that includes an actuator, wherein the actuator periodically changes at least one of an optical path of the first illumination light and an optical path of the second illumination light by periodically oscillating the optical element based on a modulation signal, in order to causes a periodic optical path difference to occur between an optical path length of the first illumination light and an optical path length of the second illumination light; and
   - a control circuit that generates the modulation signal and supplies the modulation signal to the modulator, wherein
   - the optical element is made to periodically turn around an axis parallel to a direction orthogonal to the movement direction by the actuator periodically oscillating the optical element based on the modulation signal.

2. The encoder according to claim 1, wherein
   the scale is arranged on the movable body.

3. The encoder according to claim 1, wherein
   the optical element irradiates the first illumination light and the second illumination light on the pattern of the scale in a state where the first illumination light and the second illumination light at least partly overlap with each other.

4. The encoder according to claim 1, wherein
   the optical system is a phase grating on which a diffraction grating is formed.

5. The encoder according to claim 1, wherein the optical element reflects the first illumination light and the second illumination light.

6. The encoder according to claim 1, wherein the periodic optical path difference is constant in an optical path between the optical system and the optical element.

7. An encoder that detects positional information of a movable body, making use of interference of a first illumination light and a second illumination light, the encoder comprising:

a scale that has a pattern arrayed in a movement direction of the movable body, and moves relative to the first illumination light and the second illumination light according to movement of the movable body:

a light source that emits an illumination light:

an optical element that has a first diffraction grating that diffracts the illumination light and generates the first illumination light and the second illumination light from the illumination light, wherein the optical element deflects the first illumination light and the second illumination light and causes the first illumination light and the second illumination light to be incident on the scale;

a modulator that periodically causes an optical path difference to occur between an optical path of the first illumination light and an optical path of the second illumination light by elastically deforming the optical element.

8. The encoder according to claim 7, wherein the modulator elastically deforms the optical element in a mechanical manner.

9. The encoder according to claim 7, wherein the modulator elastically deforms the optical element by applying an AC voltage on the optical element.

10. The encoder according to claim 7, wherein the modulator periodically changes a refractive index of the optical element by elastically deforming the optical element.

11. The encoder according to claim 7, wherein the optical element is elastically deformed into a sine wave shape.

12. The encoder according to claim 7, wherein the optical element has a second diffraction grating that diffracts the first illumination light and the second illumination light and causes the first illumination light and the second illumination light to be incident on the scale.

13. The encoder according to claim 7, wherein the modulator periodically causes the optical path difference to occur by the optical element elastically deforming owing to the piezoelectric effect.

14. An encoder that detects positional information of a movable body, making use of interference of a first illumination light and a second illumination light, the encoder comprising:

a scale that has a pattern arrayed in a movement direction of the movable body, and moves relative to the first illumination light and the second illumination light according to movement of the movable body:

a light source that emits an illumination light:

an optical system that generates the first illumination light and the second illumination light from the illumination light:

an optical element that is arranged in an optical path between the optical system and a photodetection element, wherein the optical element respectively deflects the first illumination light and the second illumination light generated at the optical system and causes the first illumination light and the second illumination light to be incident on the scale:

a modulator that includes an actuator, wherein the actuator periodically changes at least one of a position of incidence of the first illumination light on the scale and a position of incidence of the second illumination light on the scale by periodically oscillating the optical element based on a modulation signal, in order to cause a periodic optical path difference to occur between an optical path length of the first illumination light and an optical path length of the second illumination light; and a control circuit that generates the modulation signal and supplies the modulation signal to the modulator, wherein the optical element is made to periodically turn around an axis parallel to a direction orthogonal to the movement direction by the actuator periodically oscillating the optical element based on the modulation signal.

15. The encoder according to claim 14, wherein the actuator periodically oscillates the optical element in the movement direction based on the modulation signal.

* * * * *